(12) United States Patent
Moriya

(10) Patent No.: US 11,128,784 B2
(45) Date of Patent: Sep. 21, 2021

(54) CAMERA DEVICE

(71) Applicant: Axis AB, Lund (SE)

(72) Inventor: Ryoko Moriya, Tokyo (JP)

(73) Assignee: AXIS AB, Lund (SE)

(*) Notice: Subject to any disclaimer, the term of this patent is extended or adjusted under 35 U.S.C. 154(b) by 0 days.

(21) Appl. No.: 17/037,835

(22) Filed: Sep. 30, 2020

(65) Prior Publication Data

US 2021/0160404 A1 May 27, 2021

(30) Foreign Application Priority Data

Nov. 26, 2019 (EP) .................................... 19211503

(51) Int. Cl.
  *H04N 5/225* (2006.01)
  *H04N 5/232* (2006.01)
(52) U.S. Cl.
  CPC ......... *H04N 5/2252* (2013.01); *H04N 5/2253* (2013.01); *H04N 5/23299* (2018.08)
(58) Field of Classification Search
  CPC . H04N 5/2252; H04N 5/23299; H04N 5/2253
  See application file for complete search history.

(56) References Cited

U.S. PATENT DOCUMENTS

| 6,357,936 | B1 | 3/2002 | Elberbaum |
| 7,990,468 | B2* | 8/2011 | Yamamoto ........... F16M 11/126 348/373 |
| 10,331,019 | B2 | 6/2019 | Bingleman et al. |

| 2007/0217782 | A1* | 9/2007 | McCutchen ........... G03B 17/08 396/427 |
| 2011/0064403 | A1* | 3/2011 | Nakano .................. G03B 17/02 396/535 |
| 2011/0310293 | A1* | 12/2011 | Yamauchi .............. G03B 15/00 348/373 |
| 2012/0188441 | A1* | 7/2012 | Takizawa ........... H04N 5/23264 348/374 |

(Continued)

FOREIGN PATENT DOCUMENTS

| JP | 4181448 B2 | 11/2008 |
| WO | 2018/158608 A1 | 9/2018 |
| WO | 2018/223230 A1 | 12/2018 |

OTHER PUBLICATIONS

Extended European Search Report dated Jun. 12, 2020 for the European Patent Application No. 19211503.8.

*Primary Examiner* — Amy R Hsu
(74) *Attorney, Agent, or Firm* — Volpe Koenig

(57) ABSTRACT

A camera device comprises a camera unit including an outer shell with a spherical shape and provided with an equatorial groove, a base member provided with a seating, and a cover provided with a pivot defining a tilting axis and an aperture for providing a free line of sight for the camera unit. The camera unit is arranged between the seating and the cover such that the pivot is received by the equatorial groove and such that the cover and the seating of the base member are pressed against the outer shell of the camera unit from opposing sides thereof. The pivot is arranged on a lug adjoining the cover via a lug transition and defined by a slit such that the lug is laterally displaceable in a direction parallel with the tilting axis in response to the pivot being subjected to a force having a component in said direction.

13 Claims, 4 Drawing Sheets

(56) References Cited

U.S. PATENT DOCUMENTS

| | | | | |
|---|---|---|---|---|
| 2013/0250047 A1* | 9/2013 | Hollinger | ............ | H04N 5/2252 |
| | | | | 348/36 |
| 2014/0362242 A1* | 12/2014 | Takizawa | ............. | H04N 5/2254 |
| | | | | 348/208.11 |
| 2017/0053957 A1* | 2/2017 | Ueno | ................ | H01L 27/14614 |
| 2020/0137276 A1* | 4/2020 | Fredriksson | ......... | H04N 5/2257 |

* cited by examiner

CAMERA DEVICE

FIELD OF THE INVENTION

The present invention relates to a camera device.

BACKGROUND ART

Camera devices such as network cameras may be used in many different situations, both indoors and outdoors. Such camera devices may be monitoring or surveillance cameras.

The camera device should also be able to sustain impacts to a certain degree, such as if an object makes sudden contact with the camera device.

In an outdoor environment, a camera device should be able to withstand different weather conditions such as rain or wind.

Some camera devices may be subjected to vibrations, such as if the camera device is placed on a vehicle. In such cases it is desirous for the camera device to withstand vibrations and maintain set orientation, such that the intended field of view is maintained.

In other scenarios, a camera device might be hit by a hammer or other hard object with an intention of vandalism. Some camera devices are manufactured with a hard or ruggedized casing such as to prevent the camera device from serious damage when being hit by a force.

SUMMARY

In view of that stated above, providing an improved camera device that may sustain vibrations and external forces, and that prevents serious damage of the camera device when being exposed to impacts would be beneficial.

A camera device is provided according to the following description, and preferred embodiments of the camera device will be evident from the description.

According to a first aspect of the concepts set forth herein, there is provided a camera device comprising:

a camera unit comprising an outer shell having a spherical shape and being provided with an equatorial groove having a start and an end, a base member provided with a seating, a cover provided with a pivot defining a tilting axis and an aperture for providing a free line of sight for the camera unit.

The camera unit is arranged between the seating and the cover such that the pivot is received by the equatorial groove and such that the cover and the seating of the base member is pressed against the outer shell of the camera unit from opposing Sides thereof.

The pivot has a conical or frustoconical shape, and the equatorial groove has a corresponding cross section.

The pivot is arranged on a lug adjoining the cover via a lug transition and defined by a slit such that the lug is laterally displaceable in a direction parallel with the tilting axis in response to the pivot being subjected to a force having a component in said direction.

The pivot is formed integral with the lug and a pivot transition between the pivot and the lug is formed with a radius.

Hereby, a camera device is provided which may sustain impact without serious damage. The camera device may also maintain set orientation when exposed to vibrations.

The camera unit is arranged between the seating and the cover and is also pressed therebetween. By giving the seating and the cover a suitable shape, tilting and rotation of the camera unit may be enabled.

The provision of a pivot received by the equatorial groove may enable tilting of the camera unit about a well-defined tilting axis and may also enable controlled rotation of the camera unit about a well-defined rotations axis.

The provision of a camera unit having an equatorial groove with a start and end, which equatorial groove receives the pivot of the cover, ensures that rotation of the camera unit is limited between defined end positions. By the equatorial groove having a limited extension restricting the rotatability of the camera unit, detrimental twisting of a cable connected to the camera unit may be avoided.

The arrangement of the camera unit being pressed between the seating and the cover may enable provision of a camera device that can withstand vibrations. By adjusting the pressing forces between the cover and the seating, it may be ensured that the camera unit is maintained in set orientation when exposed to vibrations while adjustment of the camera orientation may be enabled by overcoming the frictional forces formed between the camera unit and the seating, respectively between the camera unit and the cover.

By the pivot being comprised in the lug as well as the conical or frustoconical shape thereof in connection with the correspondingly shaped cross section of the equatorial groove, a force applied to the camera unit may be transferred to the lug such that the lug is laterally displaced. Thereby, a force applied onto the camera unit can be absorbed with the sole consequence that the pivot is detached from the equatorial groove and, thus the risk of serious damage to any component of the camera device may be reduced. In particular, the risk of the pivot breaking may be reduced. Thereby, control of the orientation of the camera unit may be retained.

Since the pivot transition is formed with a radius, the risk of fractures may be reduced. The radius removes the presence of sharp corners and thus prevents formation of an indication of fracture, and thereby, the risk of damages in connection with lateral displacement of the lug may be reduced.

Hence, a camera device is provided that can withstand vibrations without being misdirected and having improved durability against external impacts.

The cover may be provided with an inner projection arrangement. The camera unit may be arranged between the seating and the cover such that the inner projection arrangement of the cover and the seating of the base member is pressed against the outer shell of the camera unit from opposing sides thereof. The projection arrangement may aid the camera device in holding the camera unit in the desired place. By the projection arrangement engaging the camera unit, an even and properly adjusted pressing force may be achieved for holding the camera unit in the desired place.

The camera unit may be tiltable about the tilting axis. The aperture of the cover may have an extension as to provide a free line of sight for the camera unit within a tilting range of at least 90 degrees. By the camera being tiltable and the aperture providing a free line of sight within the tilting range, a broader area of the environment may be monitored. Due to the facts that the pivot has a conical or frustoconical shape, and that the equatorial groove has a corresponding cross section, it may be ensured that the camera unit is tiltable about a well-defined tilting axis.

The camera unit may be rotatable about a rotation axis. The conical or frustoconical shape of the pivot and the corresponding cross section of the equatorial groove may guide the rotatability of the camera unit about the rotation axis. The rotation axis may coincide with an optical axis of the camera unit. The pivot and the equatorial groove in cooperation may be configured to restrict a rotating range of the camera unit to less than 360 degrees. Typical camera devices comprise a rectangular image sensor, and it is preferable for the horizon to appear horizontal in the image. Thus, by allowing the camera unit to be rotatable about the rotation axis, the horizon may be positioned as desired in the image.

The conical or frustoconical conical shape of the pivot may have a circular base. By the pivot having a circular base, relative rotation of the pivot when received by the equatorial groove is enabled, thereby allowing tilting of the camera unit.

The inner projection arrangement may comprise an elongated ridge extending along an inner surface of the cover. The projection arrangement may have a latitudinal extension along an inner surface of the cover. The ridge may extend around the whole inner surface of the cover. By the provision of such an elongated ridge, the evenness and the adjustability of the pressing force subjected onto the camera unit may be facilitated.

The camera device may comprise a dome window. The dome window may partly enclose the cover and the camera unit. The dome window may, in response to being subjected to an external force, be configured to be displaced and to engage a protruding section of the camera unit. More specifically, when the external force is above a predefined threshold, the dome window may be displaced or deformed. In such cases, the dome window will engage the protruding section of the camera unit, thereby transferring the external force to the pivot and therefrom to the lug which will be displaced laterally thereby detaching the pivot from the equatorial groove.

The camera device may comprise a housing supporting the dome window and accommodating the base member, the camera unit and the cover. The housing may prevent any dirt or water from reaching the camera unit. The dome window may comprise a base positioned between the cover and the housing such as to hold the dome window in a desired place as well as to prevent dirt from reaching the camera unit.

The lug may comprise a weakened portion with a first thickness and the cover may have a wall thickness. The first thickness may be less than the wall thickness. The difference between the first thickness and the wall thickness may facilitate the lateral displacement of the lug when a force is subjected to the pivot. Thus, the durability and lifespan of the camera unit may be prolonged.

The lug may be integrally formed with the cover such that the weakened portion adjoins the cover via the lug transition which is formed with a radius.

The camera device may comprise a biasing arrangement comprising a spring member, wherein the biasing arrangement is configured to press the cover towards the base member against the action of the spring member. By the camera device comprising the biasing arrangement, the camera unit may be held in a desirous position with a lowered risk of harming the camera unit.

The camera unit may comprise a varifocal lens.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages will be better understood through the following illustrative and non-limiting detailed description of preferred embodiments, with reference to the appended drawings, where the same reference numerals will be used for similar elements, wherein.

DESCRIPTION OF EMBODIMENTS

The present teachings will now be set forth more fully hereinafter with reference to the accompanying drawings, in which currently preferred embodiments are shown. This teaching may, however, be embodied in many different forms and should not be construed as limited to the embodiments set forth herein; rather, these embodiments are provided for thoroughness and completeness, and to fully convey the scope of the teachings to the skilled person.

A camera device 100 will in the following be described with reference to the figures.

Figure 1:
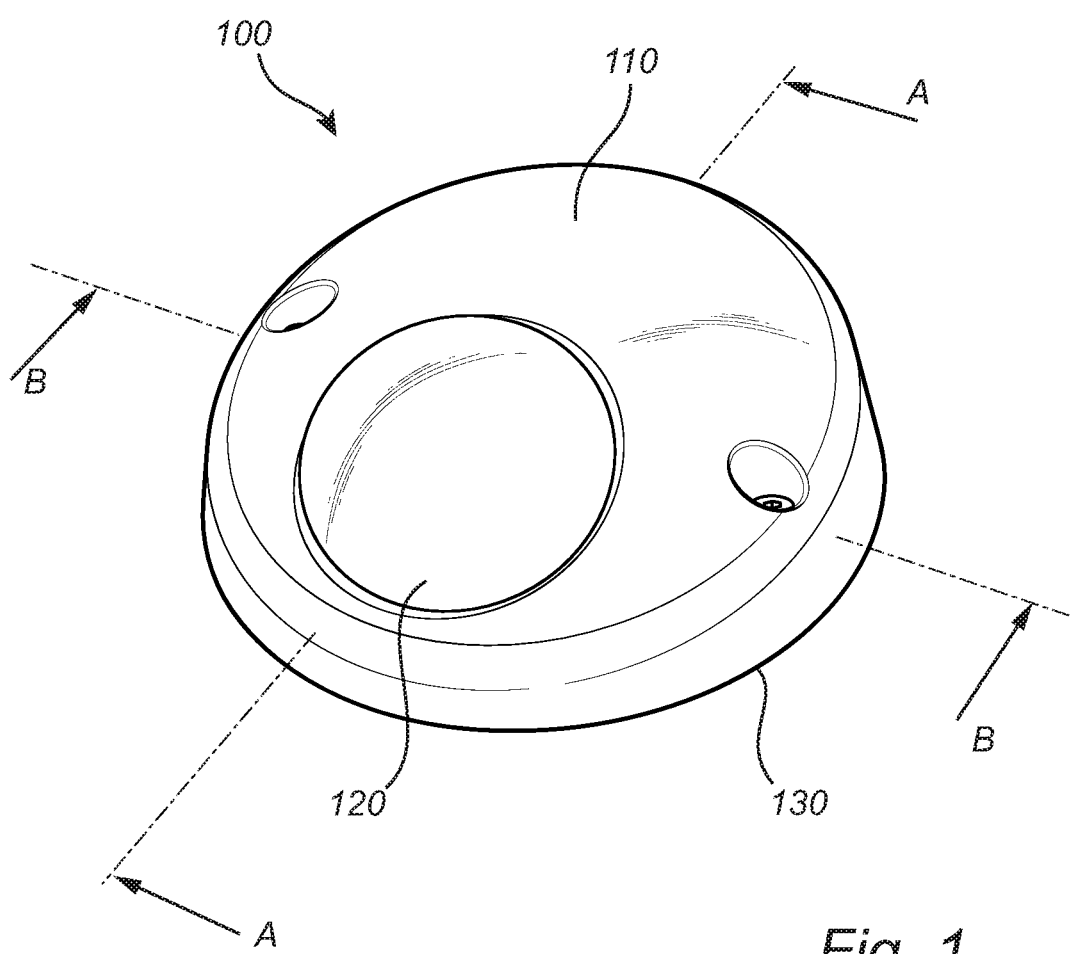
FIG. 1 is a perspective view of a camera device.

FIG. 1 illustrates an embodiment of the camera device 100. The disclosed embodiment comprises a base member 130, a housing 110 and a dome window 120 enclosing a camera unit 200 (shown in FIG. 2).

Figure 2:
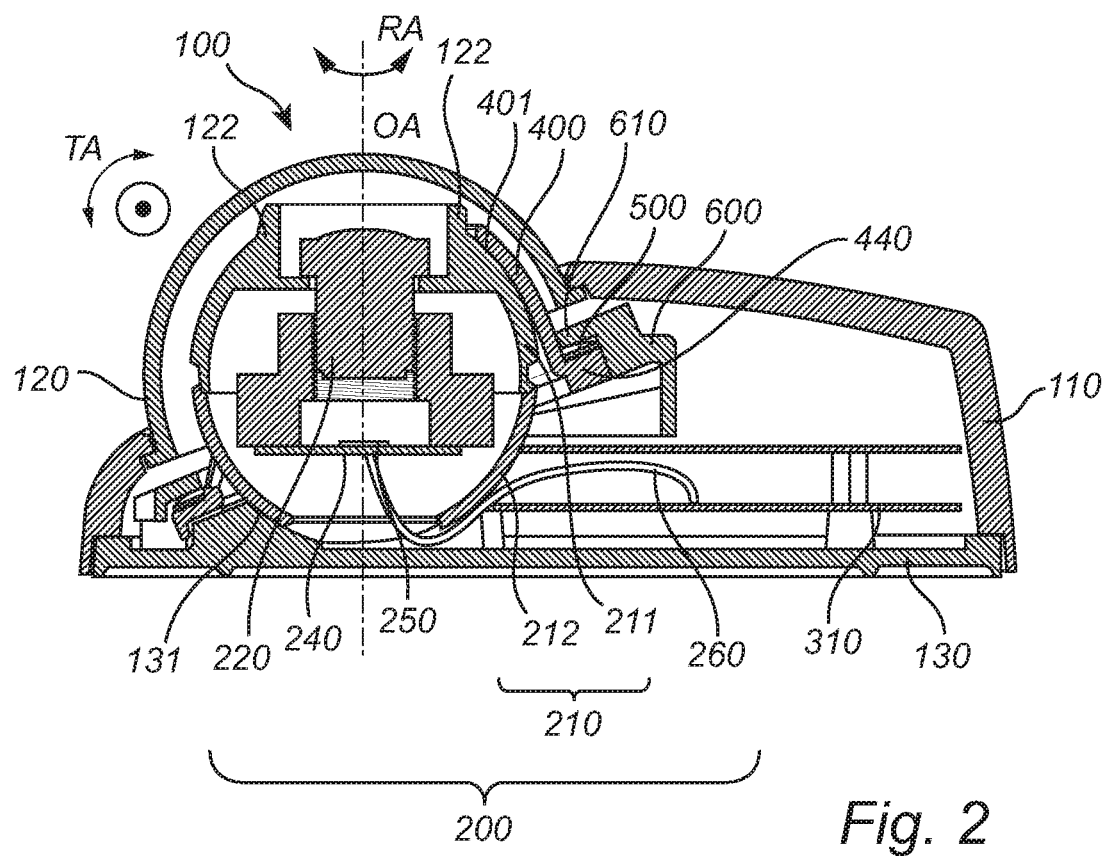
FIG. 2 is a schematic cross-sectional view taken along line A-A of the camera device illustrated in FIG. 1.

FIG. 2 discloses a cross sectional view of the camera device 100 disclosed in FIG. 1. The housing 110 accommodates the base member 130, the camera unit 200 and a cover 400. The housing 110 further supports the dome window 120.

Figure 3:
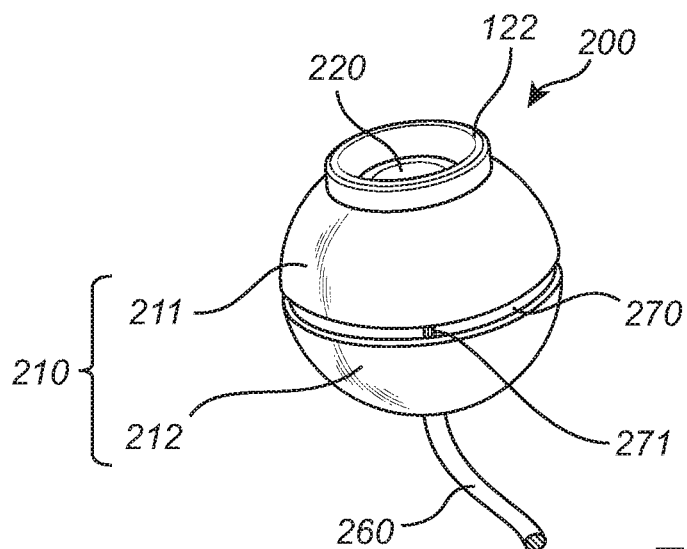
FIG. 3 is a perspective view of a camera unit.

The camera unit 200 is also shown in FIG. 3 and comprises an outer shell 210. The outer shell 210 has a spherical shape and is provided with an equatorial groove 270. The outer shell 210 may be formed such that it comprises a front shell 211 and a rear shell 212. The front shell 211 may be made of resin. The rear shell 212 may be made of resin.

The front shell 211 and the rear shell 212 are separated by the equatorial groove 270. The equatorial groove 270 has a start and an end, that is, the groove 270 has a limited extension. The section separating the end and the start of the groove forms a stop 271. The stop 271 may be formed by an integral part connecting the front shell 211 with the rear shell 212.

The camera unit 200 also comprises an optical unit 220 aligned with an optical axis OA.

In the shown embodiment, the camera unit further comprises an image printed circuit board, PCB, 240 and an image sensor 250. The image sensor 250 is typically of a rectangular shape. As is evident from the figure, the camera unit 200 is attached to a cable 260. The cable connects the camera unit 220 to a main unit (not shown). The cable 260 may be arranged to connect the image printed circuit board 240 to control printed circuit board 310.

The base member 130 comprises a seating 131 arranged for reception of the camera unit 200. The seating 131 has a semi spherical shape corresponding to the spherical shape of the camera unit 200. The base member 130 may be made of resin. Alternatively, the base member 130 may be made of metal.

Figure 4A:
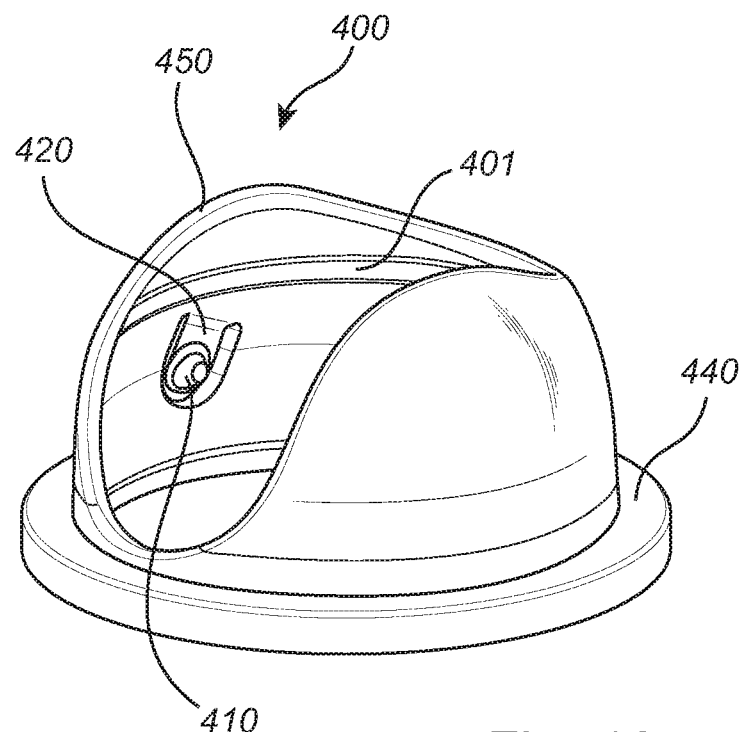
FIG. 4A is a perspective view of a cover.
Figure 4B:
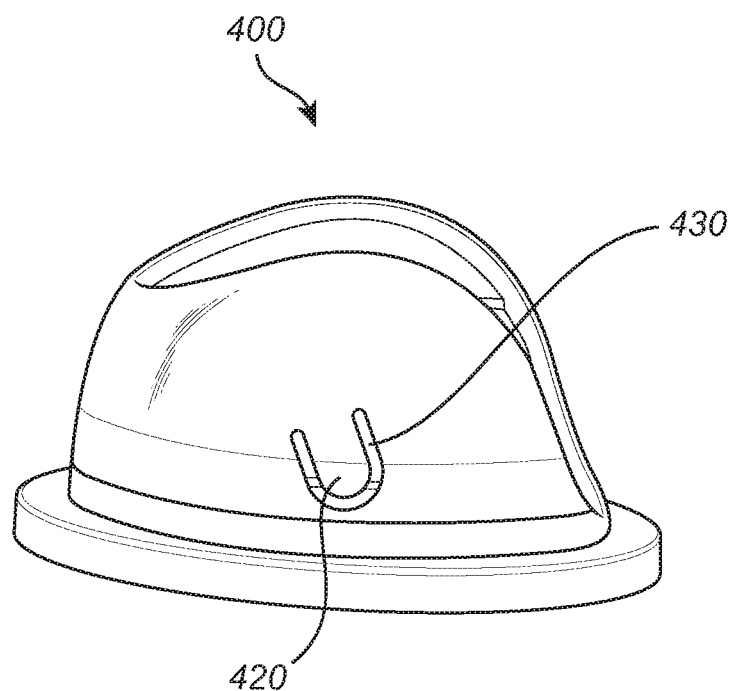
FIG. 4B is a perspective view of the cover of FIG. 4A from a different direction.

The cover 400, which is also shown in FIGS. 4A, 4B, is provided with a lug 420 supporting a pivot 410. The cover 400 has a semi spherical shape corresponding to the spherical shape of the camera unit 200. The cover 400 further comprises an aperture 450 for providing a free line of sight for the camera unit 200. The cover 400 may be made of resin.

The camera unit 200 is arranged between the seating 130 and the cover 400. In an assembled state, the pivot 410 is received by the equatorial groove 270. The camera unit 200 is arranged such that the cover 400 and the seating 131 of the base member 130 is pressed against the outer shell 210 of the camera unit 200 from opposing sides thereof. By pressing the camera unit 200 from opposing sides thereof, frictional forces are generated maintaining camera unit 200 in a desired orientation. The frictional forces formed between the camera unit 200 and the cover 400 as well as between the camera unit 200 and the seating 131 prevent the camera unit 200 from becoming accidentally redirected when subjected to small external forces, such as vibrations.

By properly balancing the frictional forces, it may be ensured that a user may manually rotate or tilt the camera unit 200 for orientation thereof.

When the base member 130 is made of resin, the front shell 211 may be made of metal. Generally, if the parts that cause friction between each other, are both made of metal, the friction force formed therebetween will be large, and in such a case it may be difficult for a user to rotate or tilt the camera unit 200.

The pivot 410 has a conical or frustoconical shape. The equatorial groove 270 of the camera unit 200 has a corresponding cross-section. Hence, the equatorial groove 270 is arranged to receive the pivot 410 of the cover 400. The conical or truncated conical shape of the pivot 410 may have a circular base.

The conical or frustoconical shape of the pivot 410 in combination with the corresponding cross-section of the groove 270 enables the pivot 410 to be relative rotatable inside the groove 270 when received thereby. Thus, the pivot 410 enables tilting of the camera unit 200 about a well-defined tilting axis TA when the pivot 410 is received by the equatorial groove 270. By the provision of a tiltable camera unit 200, the camera device 100 can capture images in a wide range. The pivot 410 in connection with the equatorial groove 270 may be arranged to provide a tilting range of at least 90 degrees.

The aperture 450 of the cover 400 may have an extension as to provide a free line of sight for the camera unit 200 within a tilting range of at least 90 degrees.

The pivot 410 and the equatorial groove 270 may be configured to cooperate such that the camera unit 200 is rotatable about a rotation axis RA. The rotation axis RA may coincide with the optical axis OA of the camera unit 200. The equatorial groove 270 may be configured to restrict a rotating range of the camera unit 200 to less than 360 degrees. More specifically, the equatorial groove extends between a start and an end with a stop 271 separating the end of the groove from the start of the groove. Thus, when the camera unit is rotated in either direction, the stop 271 will ultimately be brought into engagement with the pivot 410 thereby preventing further rotation. By preventing the camera unit 200 from unlimited rotation the life span of the camera device may be prolonged. The cable 260 connecting the camera unit 200 to the main unit may thus be kept in line with the camera unit 200 thereby prevented twisting and breaking as a result of an overly rotated camera unit 200.

Image sensors of typical camera devices often have a rectangular shape. The rotatability of the camera unit 200 about the rotation axis RA ensures that the horizon or a corresponding horizontal line of an image captured by the camera device may be adjusted to the rectangular shape of the image sensor.

As can be seen in FIG. 1, the camera device may comprise a biasing arrangement configured to press the cover 400 towards the base member 130. The biasing arrangement comprises an annular cap 600 and a spring member 500. The annular cap 600 surrounds the cover 400 and is attached to the base member 130 for instance by means of a thread joint. The annular cap 600 comprises an upper annular flange 610 which is positioned above a lower annular flange 440 of the cover 400 with the spring member 500 arranged there between. Thus, by adjustment of the distance between the upper annular flange 610 and the lower annular flange 440, the biasing effect of the spring member may be controlled. The spring member 500 may comprise a compression spring or any other type of elastically compressible element. By this configuration, the camera unit 200 itself is not fixed to the seating 131 and can thus be rotated inside the cover 400. Due to the biasing effect caused by the spring member 500, the cover 400 and seating 131 will be pressed against the outer shell 210 of the camera unit 200 ensuring that a chosen orientation of the camera unit 200 may be maintained over time. A user may still set the camera unit 200 in a new orientation by application of a force, for instance for tilting, sufficient for overcoming the frictional forces caused by the biasing effect of the spring member 500.

As is evident from FIGS. 4A-4B the cover 400 may be provided with an inner projection arrangement 401. The projection arrangement 401 may comprise an elongated ridge extending along an inner surface of the cover 400. The projection arrangement 401 may have a latitudinal extension along the inner surface of the cover 400. In some embodiments the projection arrangement 401 may be formed as several projection dots distributed along a path on the inside of the cover 401.

The provision of the inner projection arrangement 401 on the inner surface of the cover 400 may ensure a well-defined area of contact between the cover 400 and the outer shell 210 of the camera unit 200 facilitating proper balancing of the pressure force holding the camera unit in place.

Figure 5:
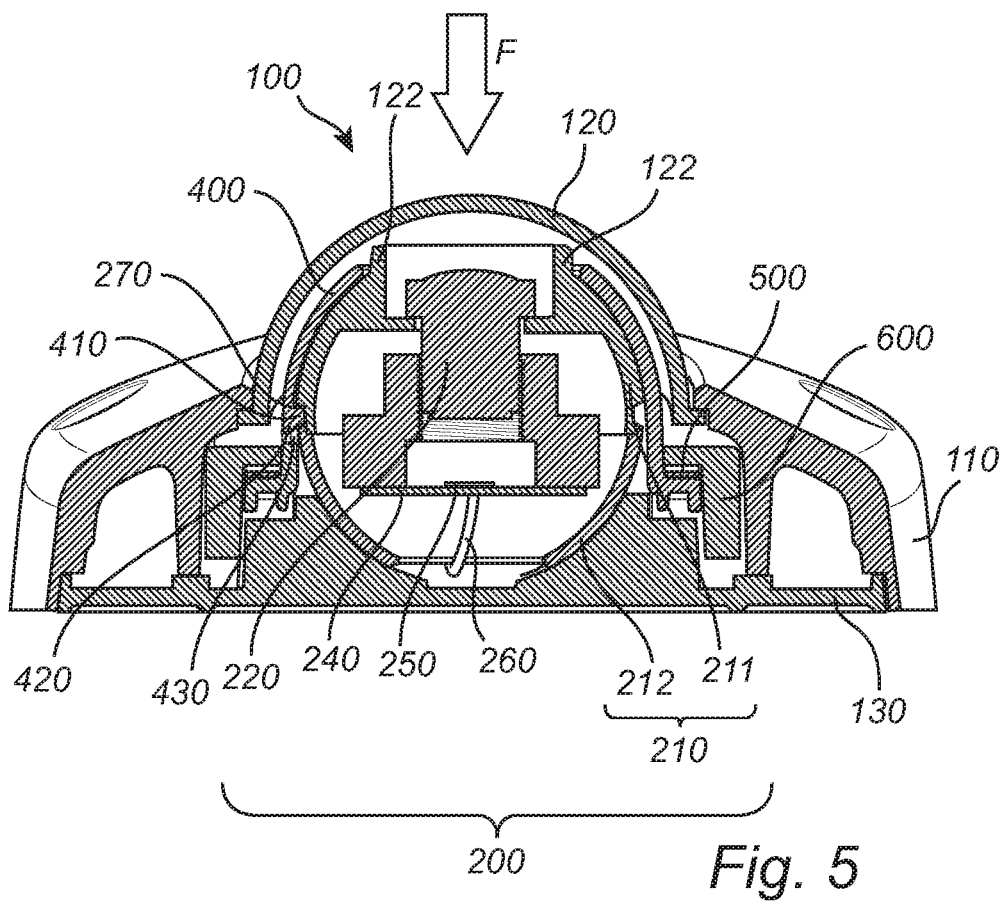
FIG. 5 is a schematic cross-sectional view taken along line B-B of the camera device illustrated in FIG. 1.

FIG. 5 illustrates another schematic cross-sectional view of the camera device disclosed in FIG. 1. The camera device is subjected to an external force illustrated by arrow F. The external force F may be in the form of a sudden impact. In the shown embodiment, the external force F is applied to the camera device 100 via the dome window 120. If external force F is of sufficient magnitude, the dome window is configured to be displaced or be deformed such that it engages the camera unit 200. In the shown embodiment, the dome window 120 is configured to engage a protruding section 122 of the camera unit 200. It is to be noted that the figure only discloses an embodiment, and that the protruding section 122 may be a different portion of the camera unit 200.

When the external force F of sufficient magnitude is applied to the camera device 100, the force may thus be transferred to the camera unit 200 when the dome window 120 engages the front shell 211 of the camera unit 200. The force is transferred to from the front shell 211 to the rear shell 212. As a consequence, the rear shell 212 will be deformed, causing an upper groove surface 273 of the equatorial groove 270 to be pressed against the pivot 410 which will cause the lug 420 of the cover 400 to be laterally displaced thereby disengaging the pivot 410 from the equatorial groove 270. By causing controlled disengagement of the pivot 410 from the groove 270 in the event of the camera device being subject to an external force of sufficient magnitude, damage of camera components, such as the pivot 410, may be prevented.

The mechanism of the lug 420 and how it is laterally displaceable will now be described more in detail with reference to FIGS. 6A-6B.

The pivot 410 is arranged on the lug 420 adjoining the cover 400 via a lug transition and defined by a slit 430 (more clearly illustrated in FIG. 4B). Thus, the lug 420 is laterally displaced in a direction D being parallel with the tilting axis TA. The lug 420 becomes laterally displaced in response to the pivot 410 being subjected to a force having a component in said direction D.

Figures 6A, 6B:
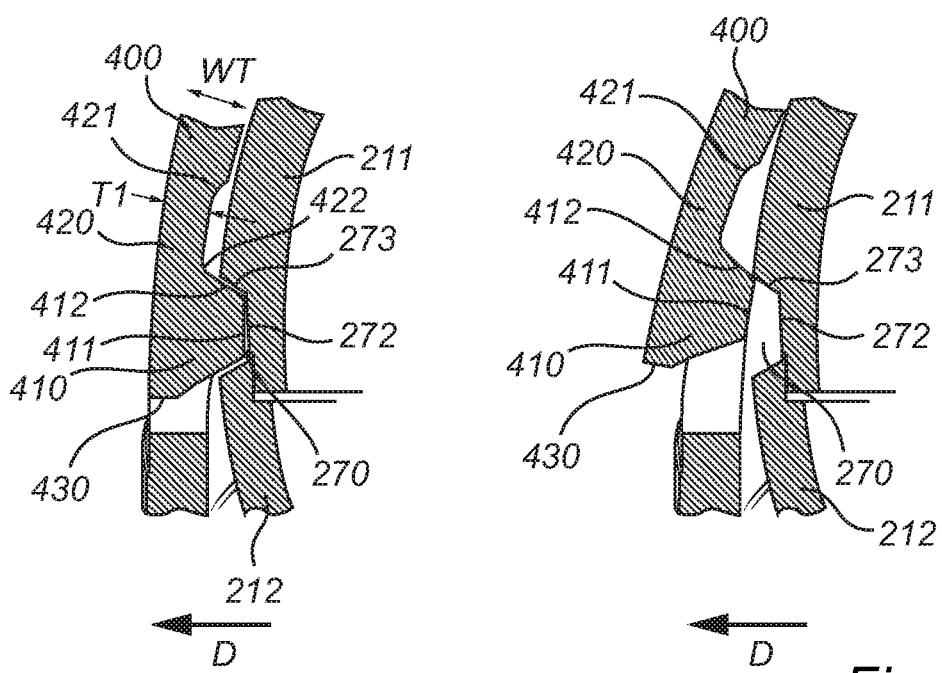
FIG. 6A is a schematic cross-sectional detail view illustrating a section of the camera device illustrated in FIG. 5.
FIG. 6B is a schematic cross-sectional view illustrating the detail of FIG. 6A in a state after the camera device having been subjected to an external force.

FIG. 6A shows the position of the lug 420 before a force is subjected to the pivot 410. As is evident from the figure a gap is formed between a bottom surface 272 of the equatorial groove 270 and a tip surface 411 of the pivot 410. Thus, there is no frictional force occurring between the bottom surface 272 and the tip surface 411 when rotating or tilting. Accordingly, the force needed for tilting or rotating is only the friction force of the between the outer shell 210 and the seating 131 and between the outer shell 210 and the cover 400.

The lug 420 may comprise a weakened portion with a first thickness T1. The cover 400 may have a wall thickness WT. The first thickness T1 of the weakened portion may be less than the wall thickness WT of the cover 400.

The lug may be integrally formed with the cover 400 such that the weakened portion adjoins the cover 400 via the lug transition 421 which is formed with a radius such as to form a smooth and gradual transition from the lug 420 to the cover 400. The absence of sharp corners in the lug transition 421 reduces the risk of fracture during the lateral displacement of the lug 420.

The pivot 410 is formed integral with the lug 420 and a pivot transition 422 between the pivot 410 and the lug 420 is formed with a radius such as to form a smooth and gradual transition from the lug 420 to the pivot 410. The absence of sharp corners in the pivot transition 422 reduces the risk of fracture during the lateral displacement of the lug 420.

The force applied to the pivot 410 and having a component in the direction D may as explained above originate from an impact force F being applied to the camera device 100.

More specifically, when the rear shell 212 of the camera unit 200 is displaced or deformed as a consequence of the dome window 120 engaging the camera unit 200, the upper groove surface 273 of the equatorial groove 270 will be pressed downwards and thereby engage the pivot 412. The pivot 410 has, as mentioned above, a conical or frustoconical cross-section and the groove 270 has a corresponding shape, so as to be able to receive the pivot 410. Thus, the downward pressing of the upper groove surface 273 will result in a force acting on the pivot having a component in the direction D.

As is evident from FIG. 6B, the lug 420 and thereby the pivot 410 is displaceable in the direction D, being in a lateral direction away from the camera unit, in response to being subjected to a force having a component in the direction D.

By such a displaceability of the lug 420, the camera unit 200 is thus disengaged from the cover and the pivot 410 supported thereby when an external force of sufficient magnitude is applied to the camera device via the dome window 120. Hereby, the risk of fracture or damaging of camera components, such as the lug 420 or the pivot 410, is eliminated or at least substantially reduced.

An external force of sufficient magnitude applied to the camera device 100 may correspond to the camera device being subjected to a kick or a punch.

In some embodiments when the cover 400 is made of a resin material the lug 420 may be elastically laterally displaceable.

In some embodiments, the housing 110 may support the dome window 120, and accommodate the base member 130, and the camera unit 200 and the cover 400. In some embodiments, camera unit 200 may comprise a varifocal lens.

The person skilled in the art realizes that the present teachings are by no means limited to the preferred embodiments described above. On the contrary, many modifications and variations are possible within the scope of the appended claims.

Additionally, variations to the disclosed embodiments can be understood and effected by the skilled person in practicing the claims, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A camera device comprising,
    a camera unit comprising an outer shell having a spherical shape and being provided with an equatorial groove having a start and an end,
    a base member provided with a seating,
    a cover provided with a pivot defining a tilting axis TA and an aperture for providing a free line of sight for the camera unit,
    wherein the camera unit is arranged between the seating and the cover such that the pivot is received by the equatorial groove and such that the cover and the seating of the base member are pressed against the outer shell of the camera unit from opposing sides thereof,
    wherein the pivot has a conical or frustoconical shape, and the equatorial groove has a corresponding cross section,
    wherein the pivot is arranged on a lug adjoining the cover via a lug transition and defined by a slit such that the lug is laterally displaceable in a direction D parallel with the tilting axis TA in response to the pivot being subjected to a force having a component in said direction D,
    wherein the pivot is formed integral with the lug and wherein a pivot transition between the pivot and the lug is formed with a radius.

2. The camera device according to claim 1, wherein the cover is provided with an inner projection arrangement and wherein the camera unit is arranged between the seating and the cover such that the inner projection arrangement of the cover and the seating of the base member is pressed against the outer shell of the camera unit from opposing sides thereof.

3. The camera device according to claim 1, wherein the camera unit is tiltable about the tilting axis TA and wherein the aperture of the cover has an extension as to provide a free line of sight for the camera unit within a tilting range of at least 90 degrees.

4. The camera device according to claim 1, wherein the camera unit is rotatable about a rotation axis RA coinciding with an optical axis OA of the camera unit, wherein the pivot and the equatorial groove in cooperation are configured to restrict a rotating range of the camera unit to less than 360 degrees.

5. The camera device according to claim 1, wherein the conical or frustoconical conical shape of the pivot has a circular base.

6. The camera device according to claim 1, wherein the inner projection arrangement comprises an elongated ridge extending along an inner surface of the cover.

7. The camera device according to claim 1, wherein the projection arrangement has a latitudinal extension along an inner surface of the cover.

8. The camera device according to claim 1, further comprising a dome window which partly encloses the cover and the camera unit, wherein the dome window, in response to being subjected to an external force F, is configured to be displaced and to engage a protruding section of the camera unit.

9. The camera device according to claim 8, further comprising a housing supporting the dome window and accommodating the base member, the camera unit and the cover.

10. The camera device according to claim 1, in which the lug comprises a weakened portion with a first thickness T1 and the cover has a wall thickness WT, wherein the first thickness T1 is less than the wall thickness WT.

11. The camera device according to claim 10, wherein the lug is integrally formed with the cover such that the weakened portion adjoins the cover via the lug transition which is formed with a radius.

12. The camera device according to claim 1, further comprising a biasing arrangement comprising a spring member, wherein the biasing arrangement is configured to press the cover towards the base member against the action of the spring member.

13. The camera device according to claim 1, wherein the camera unit comprises a varifocal lens.

* * * * *